Feb. 12, 1946.   L. P. ANTHONY   2,394,738
INTERNAL-COMBUSTION ENGINE
Filed Nov. 11, 1944   2 Sheets-Sheet 1
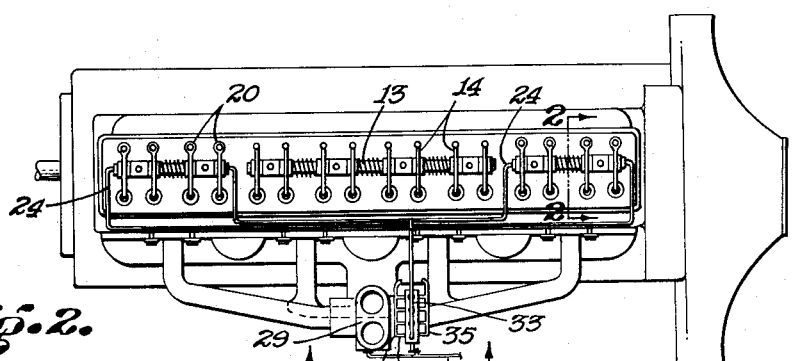
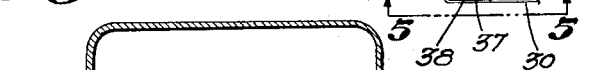
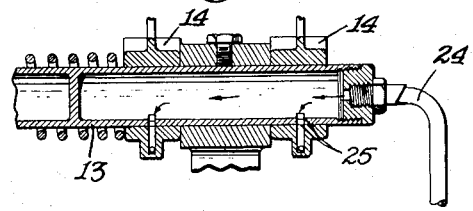
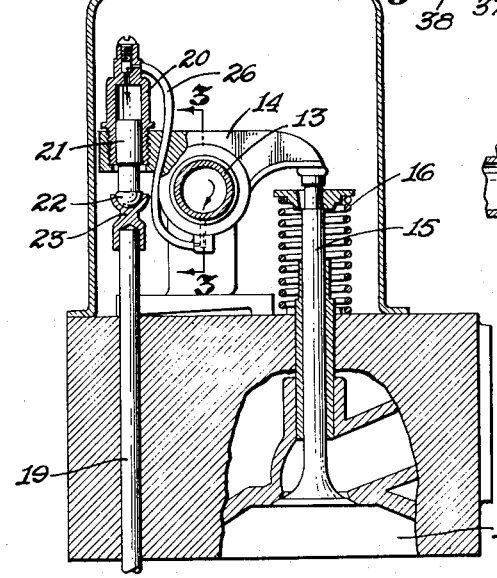
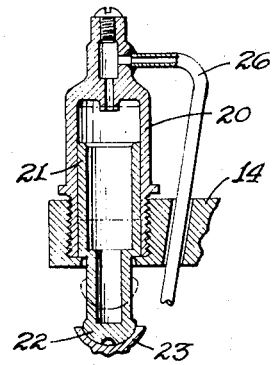
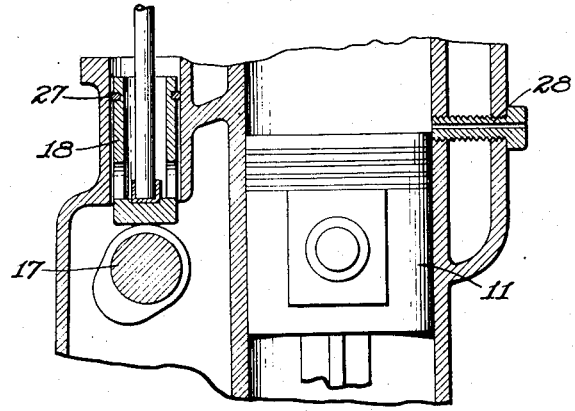
LEON P. ANTHONY
INVENTOR.
BY
Hazard and Miller
ATTORNEYS

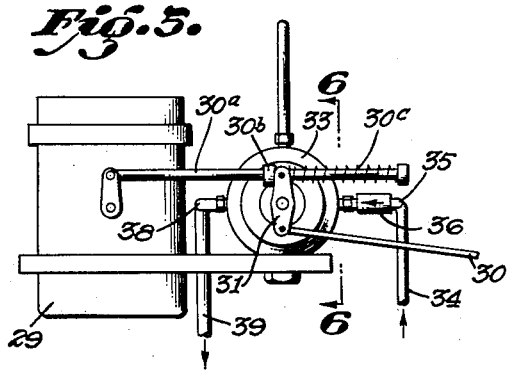
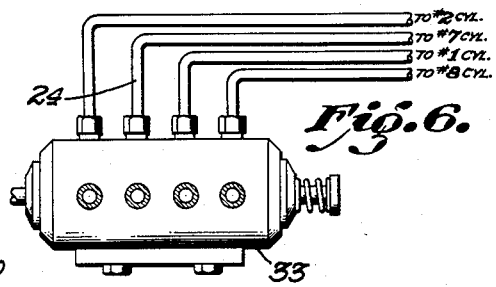
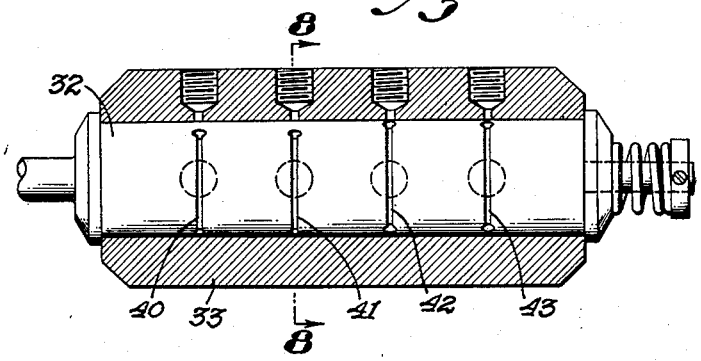
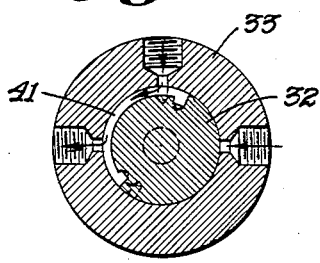
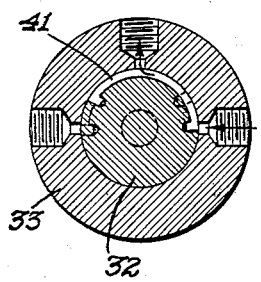
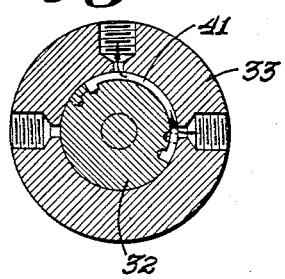

Patented Feb. 12, 1946

2,394,738

UNITED STATES PATENT OFFICE 2,394,738

INTERNAL-COMBUSTION ENGINE

Leon P. Anthony, Los Angeles, Calif., assignor of one-half to Mary Adeline Reynolds, Los Angeles, Calif.

Application November 11, 1944, Serial No. 562,939

6 Claims. (Cl. 123—52)

This invention relates to improvements in internal combustion engines.

An object of the invention is to provide an improved multi-cylinder internal combustion engine wherein some of the cylinders may be optionally brought into or cut out of operation depending upon the load that the engine is caused to assume. In the ordinary automobile engine for example, it is now quite conventional to use an engine having eight cylinders although the number of cylinders vary with different makes. This number of cylinders is frequently regarded as preferable for two reasons (1) smoothness of operation, and (2), providing adequate power for quick acceleration and hill climbing. Where the automobile is driven largely over relatively level roads, as occurs in the large percentage of normal driving, this number of cylinders is quite excessive except for quick acceleration purposes. During level road driving the load on the engine is relatively small as compared with the total amount of power that the engine is capable of producing, the load consisting principally in merely overcoming friction and air resistance. Under these conditions, the throttle of the engine is only partially open so that the amount of fuel taken in the cylinders is considerably less than their maximum capacity so that the efficiency of the engine thermodynamically is reduced. Consequently, during a very great proportion of the time that the automobile is normally driven its engine is operating inefficiently due to the fact that its cylinders are operating at only fractions of their complete capacity and are operating at low compression.

In accordance with the present invention it is proposed to provide an improved engine having a plurality of cylinders, such as eight for example, wherein all eight cylinders are caused to operate in the normal manner when the engine is subjected to extremely heavy loads such as very quick acceleration or climbing steep hills and two of these cylinders be caused to discontinue operation as the load decreases, such as occurs upon the automobile being partially brought up to the desired speed and finally to discontinue the operation of an additional pair of cylinders when the automobile is brought up to the desired speed, and is traversing level road. In this way, the remaining four cylinders alone are consuming fuel and are consuming it at much nearer their full capacity so that the engine is then operating in a much more efficient manner to maintain the desired speed in overcoming friction and air resistance. Whenever additional loads are imposed, such as is occasioned by another quick acceleration of the climbing of a steep hill, the additional cylinders may be automatically caused to resume operation in assuming this additional load.

Another object of the invention is to provide an internal combustion engine having a plurality of cylinders some of which can be optionally caused to discontinue and thereafter resume operation depending upon the load imposed which is so constructed that valves of the cylinders that are caused to discontinue operation are caused to close and remain closed while the cylinders are not operating thus preventing the passage of fuel from the carburetor through these non-operating cylinders which would merely result in a wastage of fuel.

Another object of the invention is to provide an engine having a plurality of cylinders some of which can be optionally caused to discontinue operation by the closing of their valves and causing the valves to remain closed which is so constructed that air may be admitted to these cylinders to replace air that may leak therefrom and thus stop any tendency toward oil pumping.

Still another object of the invention is to provide an internal combustion engine having an oil pump with means operable by the throttle of the engine for utilizing the pressure developed by the oil pump to effect a connecting of the valves of the cylinders that may be discontinued in their operation to the cam shaft and a disconnection of the valves from the cam shaft when the cylinders are no longer utilized.

With the foregoing and other objects in view, which will be made manifest in the following detailed description and specifically pointed out in the appended claims, reference is had to the accompanying drawings for an illustrative embodiment of the invention, wherein:

Figure 1 is a top plan view of an internal combustion engine embodying the present invention;

Fig. 2 is a vertical section taken substantially upon the line 2—2 upon Fig. 1 in the direction indicated;

Fig. 3 is a partial view in vertical section taken substantially upon the line 3—3 upon Fig. 2;

Fig. 4 is a partial view in vertical section illustrating a detail of construction;

Fig. 5 is a partial view in side elevation and may be regarded as having been taken upon the line 5—5 upon Fig. 1;

Fig. 6 is a sectional view taken substantially upon the line 6—6 upon Fig. 5 in the direction indicated;

Fig. 7 is a longitudinal vertical section through the valve illustrated in Fig. 6; and Figs. 8, 9, and 10 are sectional views taken substantially upon the line 8—8 upon Fig. 7, but illustrating the valve in its various positions.

Referring to the accompanying drawings wherein similar reference characters designate similar parts throughout, the engine illustrated in Fig. 1 may be of any conventional or preferred design having a plurality of cylinders 10, the engine illustrated having a total of eight cylinders. Within these cylinders pistons 11 are reciprocable, these pistons being connected by connecting rods to the crankshaft which is common to all of the pistons in the conventional manner. On the top of the cylinder block or cylinder head there are mounted hollow rocker arm shafts 13 on which the rocker arms 14 are mounted which serve to depress the intake and exhaust valves one of which is indicated at 15 against the action of their valve springs 16. 17 indicates the cam shaft of the engine engageable with valve lifters 18 which, in turn, lift push rods 19, the upper ends of which are operatively connected to the rocker arms 14. If the firing order of the engine is such that the center four cylinders will fire in sequence when these cylinders are only operating the push rods 19 may be connected to the rocker arms of the valves of these cylinders in the conventional manner wherein a ball and socket joint is employed, thus providing a direct mechanical train between the cam shaft 17 and each of the valves of the center four cylinders. Under these circumstances, the two cylinders at the front of the engine and the two cylinders at the rear of the engine may be assumed to be those cylinders whose operation is to be optionally disconnected or discontinued and subsequently resumed. In the case of these cylinders, the rocker arms 14 are equipped with small cylinders 20 within which are movable small hollow pistons 21. The pistons are equipped at their lower ends with balls 22 which seat in sockets 23 on the upper ends of the push rods. Oil under pressure from the oil pump of the engine, not shown, is conducted through a valve mechanism to be hereinafter described, through tubes 24 to the ends of the rocker arm shafts 13 and passes therefrom through slots 25 in the bottom of the rocker shaft through the hubs of the rocker arms and into tubes or conduits 26. The tubes 26 lead from the hubs of their respective rocker arms to the tops of the cylinders 20 mounted thereon so that when oil under pressure is delivered to the rocker arm shaft the pistons 21 will be forced downwardly to their lowermost positions thus providing a driving connection between the cam shaft 17 and the valves 15. Whenever the oil pressure thus transmitted to the cylinders 20 is released the pistons 21 can be forced upwardly in their respective cylinders 20 thus breaking or discontinuing the operative connection between the cam shaft 17 and the valves of the endmost cylinders. When this operative connection is thus broken the springs 16 are effective to keep the valves of the outer cylinders closed at all times.

It will, of course, be appreciated that when oil pressure to the cylinders 20 is released to discontinue operation of the end cylinders that the cam shaft 17 will continue to rotate. As a means of holding the push rods 19 in their uppermost positions so that these push rods will not continue to reciprocate under these circumstances and create objectionable noise, the valve lifters 18 are equipped with small piston rings 27 which engage the guides for the valve lifters and serve to frictionally hold the valve lifters and and the push rods 19 in their uppermost position. The pistons of the outer cylinder will continue to reciprocate although the valves of these cylinders are allowed to close and remain closed. During upward strokes the gas or air in these cylinders is compressed by the pistons but as their valves remain closed at all times there is no opportunity for ready escape for any appreciable amount of compressed gas therefore. During downward strokes of the piston in these cylinders the gas therein merely expands and is effective to urge the pistons downwardly. The alternate compression and expansion of the gas confined in the cylinders has largely a neutralizing or balancing effect so that no power theoretically is consumed in idle reciprocation of the pistons in the cylinders at the ends of the engine other than a small amount required to overcome friction. The gas confined within the cylinders which have their valves closed will, of course, leak to a minor extent some leakage taking place around the piston rings on the pistons. In order to replenish the gas or air in these cylinders so that the cylinders at the ends of the engine will not be operating against a vacuum which would have a tendency to cause the stopped cylinders to pump oil up past their pistons, I provide a hollow ferrule 28 for each of the cylinders whose operation can be stopped, such ferrule extending through the water jacket and cylinder wall of the engine and being located very close above the top of the piston when the piston is at the bottom of its stroke. This hollow ferrule being constantly open to atmosphere will supply air to the cylinder to replace the gas or air therein that may have leaked out. Inasmuch as the inner end of this ferrule is only exposed when the piston is at or very close to the bottom of its stroke it does not interfere with the proper operation of these cylinders when they are firing in that by the time the piston has exposed the inner end of the ferrule the exhaust valve will have already opened and much of the products of combustion permitted to escape therepast into the exhaust manifold.

In Fig. 5, I have illustrated the carburetor of the engine at 29 operable by a rod 30 which, in turn, is operated by the throttle pedal of the vehicle. Rod 30 is connected to a crank arm 31 on the end of a rotary valve, the plug or rotor of which is indicated at 32 and the casing or housing of which is indicated at 33. The upper end of the crank 31 carries a pivoted sleeve on its back which is slidably connected to a rod 30a between a stop 30b and a compression spring 30c. The arrangement is such that when the rod 30 is operated by the throttle pedal it swings the crank arm 31 and simultaneously rotates the plug 32. During the initial movement the butterfly of the carburetor 29 is simultaneously actuated as the spring 30c is not compressed. However, when the butterfly valve of the carburetor has been fully opened rod 30 can still be actuated by the throttle pedal to continue to rotate the plug or rotor 32 and during such continued movement spring 30c is compressed with the sleeve that is carried by the crank arm merely sliding on rod 30a. 34 indicates a tube leading from the oil pump of the engine, not shown. This tube conducts oil under pressure from the oil pump to a manifold 35. From this manifold four branches lead into the side of housing 33 and these branches are equipped with check valves 36 which permit flow from the manifold into the rotary valve but prevent reverse flow from the rotary valve to the manifold. On the opposite side of the valve there are four outlet branches 37 leading into a manifold 38 from which a tube 39 leads back to the crankcase of the engine. On the top of the rotary valve there are connected four tubings 24 which lead to the rocker arm shafts 13. One tube 24 conducts oil from the rotary valve to the rocker arm shaft for the valves of cylinder 8. Another tube 24 conducts oil under pressure from the rotary valve to the rocker arm shaft of cylinder 1. Similarly, the third and fourth tubes 24 conduct oil under pressure to the rocker arm shafts of cylinders 7 and 2. On the plug or rotor 32 of the rotary valve there are four grooves indicated at 40, 41, 42, and 43. Grooves 40 and 41 are in longitudinal registration with each other but are slightly out of registry with grooves 42 and 43. Their arrangement circumferentially about the plug or rotor is as follows: When the engine is initially started and is idling so that rod 30 is in the position wherein only an idling amount of fuel is supplied to the cylinders the plug or rotor 32 may be assumed to be in the position illustrated in Fig. 8, wherein oil from all of the cylinders 20 may reversely flow through tubings 26, the rocker arms, the rocker arm shafts, and tubings 24 through the grooves to the outlet manifold 38. In this position, pressure in the cylinders 20 is completely released and there is no operative connection between the cam shaft 17 and valves 15 of cylinders 1, 2, 7, or 8. As the throttle pedal is depressed the butterfly valve of the carburetor is opened supplying additional fuel to the intake manifold which can be taken in to the center four cylinders of the engine only due to the fact that the intake valves of cylinders 1, 2, 7, and 8 are allowed to remain closed. This condition continues until the central four cylinders are operating at substantially maximum capacity under which condition these cylinders are operating with maximum efficiency. However, the load that the engine may be caused to assume by quick acceleration or hill climbing may be in excess of the power these four cylinders may be able to deliver. A further depression of the throttle pedal then causes the plug or rotor 32 to rotate into a position substantially as illustrated in Fig. 9, wherein grooves 40 and 41 have established communication between the manifold 35 and the tubes 24 leading to the rocker arm shafts of cylinders 2 and 7. As indicated in dotted lines on Figs. 8, 9, and 10, grooves 42 and 43 do not establish communication through the rotary valve until after communication has been established by grooves 40 and 41. Consequently in this intermediate position shown in Fig. 9, oil may be transmitted from the oil pump to the cylinders 20 on the rocker arms of cylinders 2 and 7 but not cylinders 1 and 8. When cylinders 20 of cylinders 2 and 7 are thus supplied with oil under pressure from the oil pump their pistons are depressed and an operative connection is established between the cam shaft of the valves of these cylinders. When the valves of cylinders 2 and 7 are thus placed in operative connection with the cam shaft, fuel may be taken from the carburetor into these cylinders in addition to the fuel that is being supplied to the central four cylinders. Furthermore, as the butterfly valve of the carburetor has been fully opened during the rotation of plug 32 and remains fully open during the movement of plug 32 to a position wherein grooves 40 and 41 establish communication through the valve the fuel that is supplied to cylinders 2 and 7 is supplied at full capacity of these cylinders. Consequently, when cylinders 2 and 7 are brought into operation supplementing the four cenral cylinders they like the four central cylinders will be operating at full capacity and at maximum efficiency.

If the load of the engine is extremely heavy the throttle pedal may be further depressed causing grooves 42 and 43 to establish communication through the rotary valve between the oil pump and the cylinders 20 of engine cylinders 1 and 8. These cylinders consequently will finally be brought into firing operation supplementary to or auxiliary to the central six cylinders of the engine. Engine cylinders 1 and 8 when they are brought into operation will likewise be receiving fuel from the carburetor with the carburetor butterfly valve fully open so that when these cylinders start firing they will operate under maximum capacity conditions and at maximum efficiency. Whenever the throttle pedal is released the plug or rotor 32 is caused to return from the position shown in Fig. 10 through the position shown in Fig. 9 to the position shown in Fig. 8, thus breaking communication between manifold 35 and tubes 24 and allowing the oil in cylinders 20 to be returned through tubes 24 to the outlet manifold 35 to be returned to the crankcase. In order to prevent oil from one cylinder 20 passing therefrom through the rocker arm shaft 13 to the cylinder 20 of adjoining rocker arms the rocker arm shafts 13 are preferably provided with partitions 45 which isolate the rocker arm of each cylinder from adjoining rocker arms. Cylinders 20 of the rocker arms of any given cylinder may be in communication with each other inasmuch as their rocker arms operate at different times and transmission of pressure from one cylinder 20 to another cylinder 20 of the same engine cylinder is therefore not objectionable. The check valves 36 prevent reverse flow from the cylinders 20 to the oil pump as there may be and frequently are moments when the pressure in the cylinders 20 is in excess of the pressure delivered or supplied by the oil pump.

From the above-described construction it will be appreciated that the improved internal combustion engine is so designed and constructed that when minimum load conditions occur a minimum number of cylinders will be firing and operating. As the load increases additional cylinders may be optionally brought into operation and under maximum load conditions the maximum number of cylinders will be operating. These are automatically cut in and cut out of operation by the operation of the throttle pedal of the engine. When a cylinder is not operating its valves close and remain closed so that no fuel is conducted therethrough and wasted. However, whenever a load demand is placed upon the engine these cylinders are available for immediate resumption of operation.

While the invention has been described in conjunction with an eight-cylinder engine it will be appreciated that it is not restricted thereto but that it may be readily adapted to engines having oher numbers of cylinders. Likewise, it is not restricted in its application to engines having their cylinders arranged in a row or in straight eight formation but it may be applied to V-type engines. By means of the present invention the engine may be caused to operate with a maximum efficiency regardless of the various loads that the engine may be caused to assume.

While I have illustrated a hydraulically operable mechanism operable by the oil pump pressure for making and breaking the connection between the cam shaft and the valves of the cylinders which can be discontinued in their operation it will be appreciated that other mechanical devices may be substituted for the hydraulic mechanism illustrated.

Various changes may be made in the details of construction without departing from the spirit and scope of the invention as defined by the appended claims.

I claim:

1. In combination with a multi-cylinder internal combustion engine having pistons thereof connected to a common crankshaft, means for optionally stopping or starting the valve action of some of the cylinders thereof, and means for admitting air to the cylinders whose valve action may have been stopped when the pistons of such cylinders are near the bottoms of their strokes.

2. In combination with a multi-cylinder internal combustion engine having the pistons thereof connected to a common crankshaft and an oil pump, means for utilizing the pressure generated by the pump for optionally bringing into or out of working operation some of the cylinders of the engine.

3. In combination with a multi-cylinder internal combustion engine having the pistons thereof connected to a common crankshaft and an oil pump, means utilizing the pressure generated by the pump for optionally starting and stopping the valve action of some of the cylinders thereof.

4. In combination with a multi-cylinder internal combustion engine having the pistons thereof connected to a common crankshaft and an oil pump, means operable by the throttle of the engine for utilizing the pressure generated by the oil pump for optionally bringing into or out of working operation some of the cylinders of the engine.

5. In combination with a multi-cylinder internal combustion engine having the pistons thereof connected to a common crankshaft and an oil pump, means operable by the throttle of the engine for utilizing the pressure generated by the oil pump for optionally bringing into or out of working operation the valve actions of some of the cylinders of the engine.

6. In combination with a multi-cylinder internal combustion engine having the pistons thereof connected to a common crankshaft and an oil pump, means operable by the throttle of the engine for utilizing the pressure generated by the oil pump for optionally bringing into or out of working operation the valve actions of some of the cylinders of the engine, and means for admitting air to the cylinders whose valve actions may have been stopped when the pistons thereof are near the bottoms of their strokes.

LEON P. ANTHONY.